No. 813,373. PATENTED FEB. 20, 1906.
F. W. GAERTNER.
PROCESS FOR EXTRACTING ALBUMIN FROM VEGETABLE SUBSTANCES.
APPLICATION FILED APR. 29, 1905.
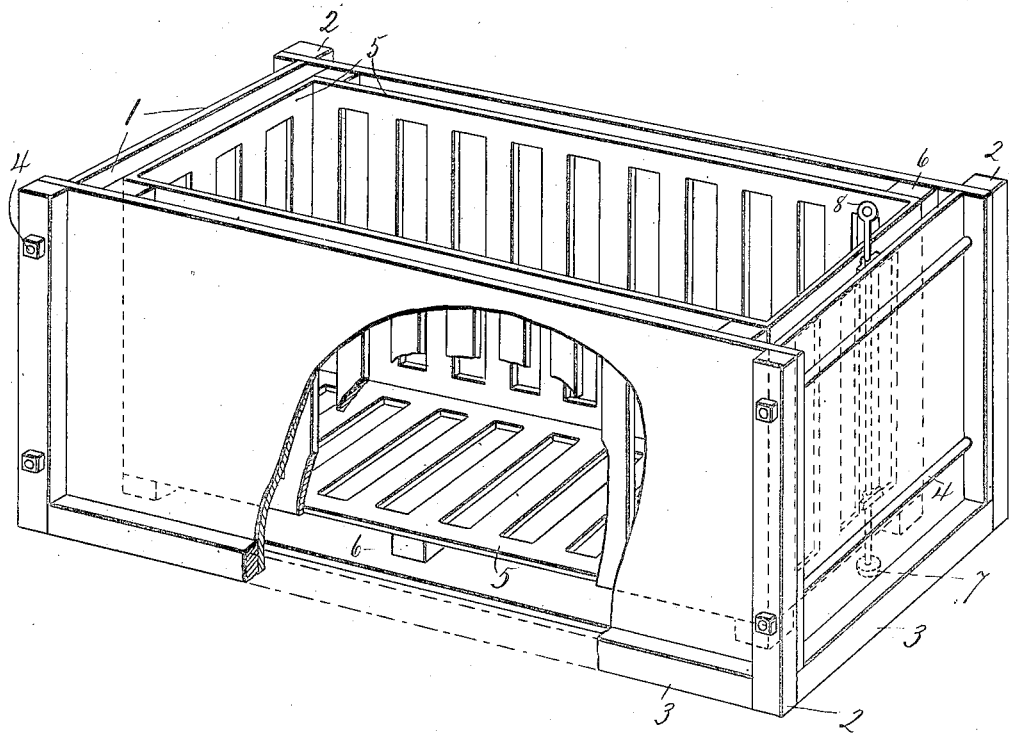
Witnesses
Allan H. Frost
M. B. Smith
Inventor
Frederick W. Gaertner
By his Attorney Alfred Wilkinson

UNITED STATES PATENT OFFICE.

FREDERICK W. GAERTNER, OF NIAGARA FALLS, NEW YORK.

PROCESS FOR EXTRACTING ALBUMIN FROM VEGETABLE SUBSTANCES.

No. 813,373. Specification of Letters Patent. Patented Feb. 20, 1906.

Application filed April 29, 1905. Serial No. 258,004.

*To all whom it may concern:*

Be it known that I, FREDERICK W. GAERTNER, a subject of the German Emperor, residing at Niagara Falls, in the county of Niagara and State of New York, have invented certain new and useful Processes for Extracting Albumin from Vegetable Substances; and I do hereby declare the following to be a full, clear, and exact description of the invention, such as will enable others skilled in the art to which it appertains to make and use the same.

My invention is a new and economical process for extracting the albumin from vegetable substances by which an increased product is obtained; and it consists, essentially, in mixing the vegetable matter in the form of meal in a warm saline solution at a temperature not above 40° centigrade and maintaining it there for several hours to dissolve out of the vegetable matter the largest possible quantity of the albumin, then filtering the solution and boiling the filtrate to coagulate the albumin. The coagulated albumin is then filtered out and dried. Thereafter if necessary to purify or bleach the coagulated albumin this may be done by treatment with sodium or a sodium compound by mixing the coagulated albumin with water and adding to the mixture peroxid of sodium and some suitable acid, preferably sulfuric acid.

By observing the effect of salt on various forms of albumin I have discovered that the extraction of pure albumin from various vegetable substances—for instance, rape-seed—may be effected by a saline solution and the albumin then coagulated—by boiling more economically and with a larger resultant product than has ever before been obtained commercially. The albumin may then be purified by the use of sodium more perfectly and economically, all without the use of alcohol and expensive special machinery.

The preferably raw material is rape-seed cake from which the bulk of the oil has been extracted, as this is a material which gives the largest amount of coagulable albumin of any known vegetable material and also because it is of little value after the oil has been extracted, except as a cattle-food. The rape-seed cake, reduced to the form of meal or flour, is mixed with several times its own bulk of water, not substantially less than five nor substantially more than twelve parts of water, and I have found a proportion of not substantially less than ten parts of water to one of meal gives a good filtration. Less than about five parts of water gives a thick mushy mixture that is difficult to filter. In a mixture of five parts of water to one of meal only the natural salts contained in the seed are necessary to obtain the largest amount of albumin coagulable by heat; but as the amount of water is increased above five parts I have found that the amount of albumin obtained is proportionately decreased. I therefore add to the solution salt in a percentage of not less than five per cent. nor more than twelve per cent. to the amount of water above five parts of water. About seven per cent. of salt to said proportion of water above five parts I have found to be desirable. For instance, to one thousand pounds of meal mixed with ten thousand pounds of water—that is, about twelve hundred and fifty gallons of water—I add three hundred and fifty pounds of salt, which is about seven per cent. of the extra five parts of water. This mixture is thoroughly mixed and maintained for several hours—five hours, more or less, is desirable—at a temperature of from 30° to 40° centigrade. The temperature should not be over 40° centigrade, which would extract the oil left in the meal, rendering the purification of the albumin more difficult and also as a minor consideration rendering the remaining waste meal less desirable as a cattle-food. After this the albumin is filtered out, boiled to coagulate the albumin, cleaned, dried, and broken or ground up into suitable sizes for use.

Generally speaking, it will be found desirable to bleach and to purify the albumin to remove impurities and all taste and odor—for instance, the usual bitter taste. As by the action of water alone the bitter stuff and other impurities are not entirely dissolved and carried off, and a protracted action of water, especially of hot water, which is necessary to increase the solubility of said bitter stuff and other impurities, would cause a partial decomposition of the albumin, and as the process of coagulating and purifying the albumin by alcohol in a centrifugal machine which is described in my Patent No. 710,190 proved too expensive on account of the high price of alcohol and the special machinery required, this purification may be done effectively and economically by treatment with any suitable sodium compound (peroxid of sodium is desirable) in any suitable way—for instance, in a cold or cool solution in a suitable tank, such as is shown in the drawing herewith. The tank should be made entirely of wood with no nails or other iron in its interior to come into contact with the solution.

The tank may desirably be made of clear white pine, free from knots, in which a filter-cloth is sustained clear of the bottom and the walls, so as to permit the water readily to drain off through the waste-hole.

Referring to the drawing, 1 indicates the tank, suitably reinforced at the corners and edges by posts and strips 2 2 and 3 3. 4 represents external bolts bracing the tank. Inside the tank and at a sufficient distance from the sides and bottom is arranged a lining or frame 5 of lattice or open work, also of clean white pine without nails, which serves to support the filter-cloth and the albumin therein contained. 6 6 are blocks or strips for supporting the lining in position. 7 is plug, and 8 handle therefor, for waste-hole, centrally arranged in tank, or, as here shown, at one end, which may be slightly lower.

Thus purification and bleaching by the action of peroxid of hydrogen may desirably be effected in the following way: The vat is filled with clear cold water to a height completely to cover the albumin to be purified, peroxid of sodium is added, and as this with water alone would produce caustic soda, $Na_2O_2 + H_2O = 2NaOH$, (caustic soda,) $+ H_2O_2$, (peroxid of hydrogen,) which would corrode many of the materials and also permit the oxygen, the main factor of the bleaching process, to pass off rapidly, it is desirable, first, to mix with the water any suitable acid, preferably sulfuric acid, and then to add the peroxid of sodium in small quantities, while constantly stirring. The reaction is

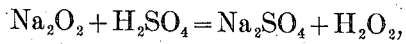
$$Na_2O_2 + H_2SO_4 = Na_2SO_4 + H_2O_2,$$

(Glauber salt and hydrogen peroxid.) The albumin, which has been partially dried, as in a centrifugal machine, and reduced to a suitable size, is then put into the filter-cloth suspended in the bath and the neutral material thoroughly mixed with the neutral bath.

The proportions of acid and sodium peroxid may be much varied, depending on the amount of albumin, purity and color necessary or desired, time occupied, and I therefore do not wish to limit myself to the proportions; but from one to twelve pounds of peroxid of sodium to one hundred gallons of water are about the limits. The proportion of sulfuric acid to peroxid of sodium is almost constant—i. e., about 1.33: 1. As a desirable illustration, in a one-hundred-gallon tank put fifty gallons of water, one hundred and twenty pounds of albumin, about five and one-third pounds of sulfuric acid, and four pounds of peroxid of sodium. The albumin is left in the bath from one to twelve hours—a longer or shorter time, depending on the degree of result desired, proportions of parts, &c.

It is desirable to add a small quantity of a suitable alkali, preferably ammonia, sufficient to make the bath slightly alkaline, which will greatly accelerate the bleaching operation. The ammonia should be added in very small quantities, stirring each quantity in thoroughly and then testing until slight alkalinity is obtained.

When the desired result has been reached, the liquid may be drained off through the waste in the bottom of the tank and the purified albumin placed in a centrifugal machine, where it is rinsed, whereby the adherent Glauber salt is easily removed, and the albumin, then absolutely pure, is first dried in the centrifugal machine, then completely dried in kilns, and afterward ground to a fine powder. As the powder is more or less heated in the grinding application, it is desirable to cool it, as by exposing it to an air-current, before it is packed to avoid a disagreeable moldy taste it sometimes acquires when packed or stored hot.

It will be understood that my process is particularly adapted for the production of a pure vegetable albumin on a commercial scale, and the important new feature of the invention is the use of salt, whereby at a small expense I obtain at least three to four per cent. more of the pure albumin than by any other process which can be practiced commercially. The cost of the salt is very small. Furthermore, by the use of peroxid of sodium or other desirable sodium oxid I thoroughly purify the albumin, obtaining a product worth one dollar or more per pound, which is desirable to be used alone or mixed with other materials for food, particularly for invalids or undernourished persons.

The advantages of my process are in a decided improvement in economy and simplicity and in obtaining a larger product at a less expense. The cleaning and bleaching also are more effectively produced. It will be understood that the extracting and purifying are a continuous process, and in most cases the purifying is essential to obtain a useful material.

Having thus described my invention, what I claim as new, and desire to secure by Letters Patent, is—

1. The process of obtaining purified albumin from vegetable substances, which consists in mixing the vegetable substance in a finely-subdivided condition in a warm saline solution and maintaining the substance in the solution for several hours, filtering the mixture, boiling the filtrate to coagulate the albumin, filtering out and drying the albumin, then depositing the albumin in a subdivided form in a cool bath of water, containing sodium peroxid and a suitable acid, for from one hour to twelve hours, then removing and drying the albumin.

2. The process of extracting albumin from vegetable substances, which consists in reducing the vegetable substance substantially to the form of meal, mixing the same in a warm saline solution in the proportion of from seven to ten parts of the solution to one of the meal, said solution containing salt in the proportion of about five per cent. to about twelve per cent. of the amount of water in excess of about five parts of water, maintaining the mixture for several hours at a temperature of from about 30° centigrade to about 40° centigrade to dissolve out the albumin, then filtering the mixture, boiling the filtrate to coagulate the albumin, then filtering out and drying the albumin.

3. The process of extracting albumin from vegetable substances, which consists in reducing the vegetable substance to about the form of meal, mixing the meal in a warm saline solution in the proportion of about one part of meal to about ten parts of water, said solution containing salt in the proportion of about seven per cent. to the amount of water above five parts of water, maintaining the mixture at a temperature of from 30° centigrade to 40° centigrade for five hours more or less, to extract the albumin, then filtering the mixture and boiling the filtrate to coagulate the albumin, then filtering out the coagulated albumin, then drying and breaking up the albumin into suitable sizes.

4. In a process for extracting albumin from a vegetable substance, the method of purifying the albumin, which consists, in reducing the albumin to a suitable size and then depositing it in a cool bath containing peroxid of sodium and sulfuric acid, maintaining the albumin in the bath for from one to twelve hours, removing the albumin from the bath, then drying and grinding the albumin.

5. In a process for extracting albumin from vegetable substances the method of purifying and bleaching the albumin, which consists in preparing in a wooden tank a cool solution containing from one to twelve pounds of peroxid of sodium to one hundred gallons of water, sulfuric acid in the proportion of about one and one-third to one part of peroxid of sodium and a small quantity of an alkali, by first mixing the sulfuric acid with the water, adding the peroxid of sodium in small quantities and stirring it in, adding the alkali in very small quantities and stirring it in, then suspending the albumin in a subdivided form in a filter-cloth in the solution for from one to twelve hours, thoroughly mixing the albumin with the solution, then removing, rinsing and drying the albumin and then grinding it to a fine powder.

In testimony whereof I affix my signature in presence of two witnesses.

FREDERICK W. GAERTNER.

Witnesses:
GEORGE J. SHUMACHER,
A. J. BARR.